US010821961B2

(12) United States Patent
Kim

(10) Patent No.: US 10,821,961 B2
(45) Date of Patent: Nov. 3, 2020

(54) METHOD AND APPARATUS FOR CONTROLLING ENGINE TORQUE OF MILD HYBRID ELECTRIC VEHICLE

(71) Applicants: Hyundai Motor Company, Seoul (KR); Kia Motors Corporation, Seoul (KR)

(72) Inventor: YoungMin Kim, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 116 days.

(21) Appl. No.: 16/211,752

(22) Filed: Dec. 6, 2018

(65) Prior Publication Data

US 2020/0108817 A1  Apr. 9, 2020

(30) Foreign Application Priority Data

Oct. 4, 2018  (KR) .......................... 10-2018-0118432

(51) Int. Cl.
*F02D 41/30* (2006.01)
*B60K 6/26* (2007.10)
(Continued)

(52) U.S. Cl.
CPC .............. *B60W 20/10* (2013.01); *B60K 6/26* (2013.01); *B60K 6/485* (2013.01);
(Continued)

(58) Field of Classification Search
CPC ......... B60W 20/10; B60W 2710/0616; B60W 2510/0638; B60W 2050/0026;
(Continued)

(56) References Cited

U.S. PATENT DOCUMENTS 5,846,155 A * 12/1998 Taniguchi ................ B60K 6/48
477/2
2010/0101529 A1 * 4/2010 Lewis ................... F02D 19/088
123/299

(Continued)

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

The present invention relates to an engine torque control method of a mild hybrid electric vehicle including an engine as a power source, the mild hybrid electric vehicle further includes a mild hybrid starter and generator (MHSG) which starts the engine or operates as a generator by an engine torque and a controller which controls the change of a fuel injection mode among a MPI engine mode using a low pressure injector which injects the fuel to an intake port of the engine, a GDI engine mode using a high pressure injector which injects a fuel to a combustion chamber of the engine, and a hybrid MPI and GDI engine mode using both the low pressure injector and the high pressure injector, and the engine torque control method includes: determining whether a fuel injection mode is a MPI engine mode, by the controller, measuring a maintaining period when the MPI engine mode is maintained by a timer when the fuel injection mode is the MPI engine mode, determining whether the fuel injection mode is changed from the MPI engine mode to the GDI engine mode or the hybrid MPI and GDI engine mode, by the controller; and, driving the MHSG by the controller to assist an engine torque when the fuel injection mode is changed from the MPI engine mode to the GDI engine mode or the hybrid MPI and GDI engine mode.

6 Claims, 4 Drawing Sheets

(51) Int. Cl.
 *B60W 20/10* (2016.01)
 *B60K 6/485* (2007.10)
 *B60W 50/00* (2006.01)

(52) U.S. Cl.
 CPC ..... *F02D 41/3064* (2013.01); *F02D 41/3094* (2013.01); *B60W 2050/0026* (2013.01); *B60W 2510/0638* (2013.01); *B60W 2710/0616* (2013.01); *B60Y 2200/92* (2013.01); *F02D 2200/101* (2013.01); *F02D 2200/1002* (2013.01); *F02D 2250/21* (2013.01)

(58) Field of Classification Search
 CPC ............ F02D 41/3064; F02D 41/3094; F02D 2250/21; F02D 2200/101; F02D 2200/1002; F02D 2250/24; B60K 6/485; B60K 6/26; B60Y 2200/92; F02N 11/04
 See application file for complete search history.

(56) References Cited

U.S. PATENT DOCUMENTS

| | | | |
|---|---|---|---|
| 2015/0051762 A1* | 2/2015 | Banker | B60W 20/00 701/22 |
| 2015/0240740 A1* | 8/2015 | Toda | F02D 41/047 123/445 |

* cited by examiner

METHOD AND APPARATUS FOR CONTROLLING ENGINE TORQUE OF MILD HYBRID ELECTRIC VEHICLE

CROSS-REFERENCE TO RELATED APPLICATION

This application claims priority to and the benefit of Korean Patent Application No. 10-2018-0118432 filed in the Korean Intellectual Property Office on Oct. 4, 2018, the entire contents of which are incorporated herein by reference.

BACKGROUND OF THE INVENTION

(a) Field of the Invention

The present invention relates to a method and an apparatus for controlling an engine torque of a mild hybrid vehicle, and more particularly, to a method and an apparatus for controlling an engine torque of a mild hybrid vehicle which supplement an insufficient engine torque generated when a MPI engine mode is changed to a GDI engine mode or a third fuel injection.

(b) Description of the Related Art

As it is widely known, a mild hybrid electric vehicle uses both an internal combustion engine and a battery power as a power source. That is, the mild hybrid electric vehicle efficiently combines and uses a power of an engine and a power of a motor.

A general engine equipped in the mild hybrid electric vehicle of the related art may be classified into a multi-point injection (MPI) engine having a fuel supplying method in which an injector injects the fuel to an intake port and a gasoline direct injection (GDI) engine having a fuel supplying method in which an injector directly injects the fuel into a combustion chamber of the engine.

Recently, a dual injector type engine which has a low pressure injector communicating with an intake port and a high pressure injector communicating with a combustion chamber to be used as both the MPI engine and the GDI engine is applied to the mild hybrid electric vehicle.

The engine having a dual injector may operate in a an MPI engine mode of injecting a fuel to the intake port using only the low pressure injector, a (a GDI engine mode of directly injecting the fuel to a combustion chamber using only the high pressure injector, and a hybrid MPI and GDI engine mode of injecting the fuel to the intake port and the combustion chamber using both the low pressure injector and the high pressure injector in accordance with a rotation speed of the engine.

However, when the engine having a dual injector operates in the MPI engine mode, the fuel injection by the high pressure injector is not carried out. In this case, a pressure of a high pressure fuel pump which compresses the fuel to supply the fuel to the high pressure injector is naturally reduced. Therefore, when the engine mode is changed from the MPI engine mode into the GDI engine mode or the hybrid MPI and GDI engine mode, the insufficient engine torque may be caused. Particularly, when a reduced fuel amount is equal to or higher than a predetermined amount, the impact is applied to the vehicle so that the driver may feel inconvenience.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a torque assist control method and apparatus which provide comfortable driving to a driver by assisting an insufficient engine torque generated when a MPI engine mode is changed to a GDI engine mode or a hybrid MPI and GDI engine mode by driving a mild hybrid starter and generator (MHSG).

According to an exemplary embodiment of the present invention, in an engine torque control method of a mild hybrid electric vehicle, the mild hybrid electric vehicle further includes: a mild hybrid starter and generator (MHSG) which starts the engine or operates as a generator by an engine torque and a controller which controls the change of a fuel injection mode among a MPI engine mode using a low pressure injector which injects the fuel to an intake port of the engine, a GDI engine mode using a high pressure injector which injects a fuel to a combustion chamber of the engine, and a hybrid MPI and GDI engine mode using both the low pressure injector and the high pressure injector, the engine torque control method may include: determining whether a fuel injection mode is a MPI engine mode, by the controller, measuring a maintaining period when the MPI engine mode is maintained by a timer when the fuel injection mode is the MPI engine mode, determining whether it is necessary to change the fuel injection mode from the MPI engine mode to the GDI engine mode or the hybrid MPI and GDI engine mode, by the controller; and driving the MHSG by the controller to assist an engine torque when it is necessary to change the fuel injection mode from the MPI engine mode to the GDI engine mode or the hybrid MPI and GDI engine mode.

The mild hybrid electric vehicle may further include an engine speed measuring unit which measures a speed and a load of the engine and the controller may control the changing of the fuel injection mode based on predetermined mapping data based on the speed and the load of the engine.

The engine torque control method may further include: determining whether the maintaining period is longer than the predetermined value when it is necessary to change the fuel injection mode from the MPI engine mode to the GDI engine mode or the hybrid MPI and GDI engine mode and the driving of the MHSG by the controller to assist an engine torque may be performed only when the maintaining period is larger than the predetermined value.

When the maintaining period is equal to or shorter than the predetermined value, the controller may change the fuel injection mode without driving the MHSG.

Further, according to another exemplary embodiment of the present invention, an engine torque control system of a mild hybrid electric vehicle includes: an engine which includes an intake port, a low pressure injector configured to inject a fuel to the intake port, a combustion chamber which communicates with the intake port and combusts mixed air of air and a fuel, an exhaust port which communicates with the combustion chamber and exhausts exhaust gas generated during a combustion process, and a high pressure injector which directly injects the fuel to the combustion chamber, a mild hybrid starter and generator (MHSG) which is operatively connected to the engine to start the engine or operate as a generator by the power of the engine; and a controller which controls the changing of the fuel injection mode among a MPI engine mode of injecting a fuel using the low pressure injector, a GDI engine mode of injecting the fuel using the high pressure injector, and a hybrid MPI and GDI engine mode of injecting the fuel using both the low pressure injector and the high pressure injector, based on a driving state of the engine and the controller may determine whether it is necessary to change from the MPI engine mode to the GDI engine mode or the hybrid MPI and GDI engine mode and when it is necessary to change from the MPI engine mode to the GDI engine mode or the hybrid MPI and GDI engine mode, use the MHSG to assist the engine torque based on the maintaining period when the MPI engine mode is maintained.

The engine torque control system may further include an engine speed measuring unit which measures a speed and a load of the engine and the controller may control the changing of the fuel injection mode based on predetermined mapping data based on the speed and the load of the engine.

The engine torque control system may further include a timer which measures the maintaining period and when it is necessary to change the fuel injection mode from the MPI engine mode to the GDI engine mode or the hybrid MPI and GDI engine mode, the controller may determine whether the maintaining period is longer than the predetermined value, and only when the maintaining period is longer than the predetermined value, the controller may drive the MHSG to assist the engine torque.

When the maintaining period is equal to or shorter than the predetermined value, the controller may change the fuel injection mode without driving the MHSG.

As described above, according to the exemplary embodiment of the present invention, in the mild hybrid electric vehicle mounted with an engine having a dual injector, even though a fuel injection mode of the engine is changed from the MPI engine mode to the GDI engine mode or the hybrid MPI and GDI engine mode, the MHSG is driven to assist the insufficient torque of the engine, thereby providing stable driving to the driver.

DETAILED DESCRIPTION OF THE EMBODIMENTS

Figure 1:
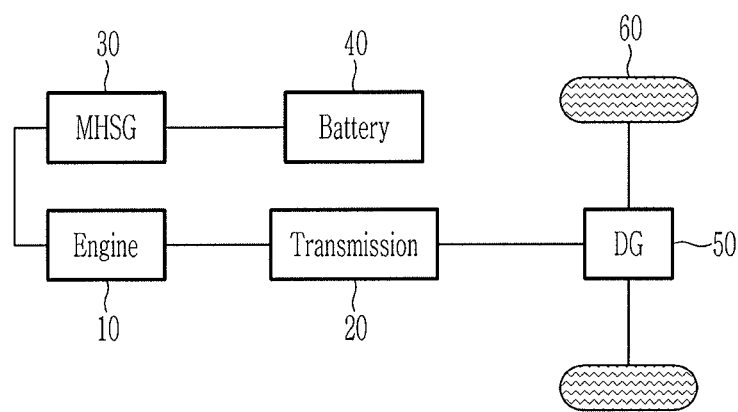
FIG. 1 is a block diagram illustrating a mild hybrid electric vehicle according to an exemplary embodiment of the present invention.

Hereinafter, the present invention will be described more fully hereinafter with reference to the accompanying drawings, in which exemplary embodiments of the invention are shown. However, the present invention is not limited to the exemplary embodiment described herein, but may be embodied in different forms.

In order to clearly describe the present invention, parts not related to the description will be omitted. Like reference numerals designate like elements throughout the specification.

Further, individual components illustrated in the drawings are optionally determined for ease of description, so that the present invention is not limited to the examples illustrated in the drawings.

FIG. 1 is a block diagram illustrating a mild hybrid electric vehicle according to an exemplary embodiment of the present invention.

As illustrated in FIG. 1, a mild hybrid electric vehicle according to an exemplary embodiment of the present invention includes an engine 10, a transmission 20, a mild hybrid starter-generator (MHSG) 30, a battery 40, a differential gear device 50, and a wheel 60.

The engine 10 serves as a power source and outputs the power when the engine is started. In an exemplary embodiment of the present invention, the engine 30 may be an engine including a dual injector.

The transmission 20 is connected to the engine 10 to shift a driving torque of the engine 10 to output the shifted driving torque to the differential gear device 50. The transmission 20 is engaged in an appropriate gear position in accordance with a vehicle speed and an operating condition and converts the driving torque of the engine 10 in accordance with the gear position and outputs the driving torque to driving wheels to maintain a driving state.

The MHSG 30 may be connected to the engine 10 to assist the output of the engine or supplied with a driving power from the battery 40 to start the engine 10. Further, the MHSG 30 operates as a generator while coasting to supply a regenerative energy to the battery 40. That is, the mild hybrid electric vehicle uses a torque of the engine 10 as primary power and uses a torque of the MHSG 30 as auxiliary power.

The battery 40 is electrically connected to the MHSG 30 so that the voltage for driving the MHSG 30 is stored. At the time of assisting the output of the engine 10, the battery 40 supplies the driving voltage to the MHSG 30 and at the time of regenerative braking, the battery 40 is charged with the voltage generated in the MHSG 30. In the exemplary embodiment of the present invention, the battery 40 may be 48 V battery, but is not limited thereto.

The differential gear device 50 is connected to the transmission 20 and appropriately distributes the driving torque (that is, a rotation speed) transmitted from the transmission 20 into different wheels 60.

The wheels 60 refer to a device which is connected to the differential gear device 50 by an axle and supports a load of the vehicle and transmits the power of the engine 10 transmitted from the axle to the road surface.

The power delivery of the mild hybrid electric vehicle is carried out such that the torque generated in the engine 10 is transmitted to an input shaft of the transmission 20 and a torque output from an output shaft of the transmission 20 is transmitted to the axle via the differential gear device 50. The axle rotates the wheel 60 so that the mild hybrid vehicle is driven by the torque generated in the engine 10. Further, the torque generated in the MHSG 30 is used to start the engine 10 or transmitted to the axle via the engine 10, the transmission 20, and the differential gear device 50 to assist the torque of the engine 10.

Figure 2:
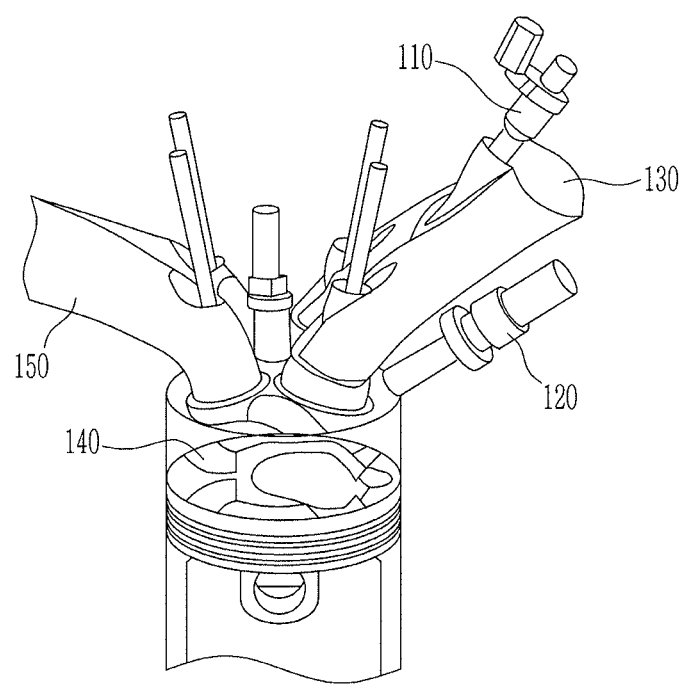
FIG. 2 is a schematic view of an engine having a dual injector according to an exemplary embodiment of the present invention.

FIG. 2 is a schematic view of an engine having a dual injector according to an exemplary embodiment of the present invention.

The engine having a dual injector includes a low pressure injector 110, a high pressure injector 120, an intake port 130, a combustion chamber 140, and an exhaust port 150.

The low pressure injector 110 communicates with the intake port 130 and is supplied with the fuel from a low pressure fuel pump (not illustrated) to inject the fuel to the intake port 130.

The high pressure injector 120 communicates with the combustion chamber 140 and is supplied with a fuel compressed by the high pressure fuel pump to directly inject the fuel to the combustion chamber 140.

The intake port 130 sucks outside air and supplies the outside air to the combustion chamber 140. Further, the intake port 130 may supply mixed air obtained by mixing the fuel injected by the low pressure injector 110 and the outside air to the combustion chamber 140.

The combustion chamber 140 may combust any one or more of mixed air which is located in the engine 10 and is supplied from the intake port 130 and mixed air obtained by mixing the fuel supplied from the high pressure injector 120 and the air received from the intake port 130.

The exhaust port 150 communicates with the combustion chamber 140 and exhausts the exhaust gas generated during the combustion process of the mixed air in the combustion chamber 140.

In the present specification and claims, a mode of injecting the fuel to the intake port 130 using the low pressure injector 110 is referred to as a MPI engine mode, a mode of injecting the fuel to the combustion chamber 140 using the high pressure injector 120 is referred to as a GDI engine mode, and a mode of injecting the fuel to the intake port 130 and the combustion chamber 140 using both the low pressure injector 110 and the high pressure injector 120 is referred to as a hybrid MPI and GDI engine mode.

When the engine 10 operates in the MPI engine mode, the high pressure fuel pump pauses and the fuel is not injected to the combustion chamber 140 by the high pressure injector 120.

In this case, the pressure in the high pressure fuel pump is reduced at a predetermined ratio to be proportional to a period when the engine operates in the MPI engine mode.

Therefore, the fuel which is reduced in proportion to the reduced amount of pressure in the high pressure fuel pump is compressed to be supplied to the high pressure injector 120 and thus a fuel amount which is supplied from the high pressure injector 120 to the combustion chamber 140 may be reduced to be smaller than a target fuel amount.

Therefore, an insufficient engine torque may be caused in proportion to a difference between a fuel amount which is actually supplied by the high pressure injector 120 and a target fuel amount which needs to be supplied from the high pressure injector 120 in accordance with the driving condition of the engine 10. Therefore, when a period when the engine operates in the MPI engine mode is long, if the MPI engine mode is switched to the GDI engine mode or the hybrid MPI and GDI engine mode, the impact may be caused.

That is, when a maintaining period of the MPI engine mode is equal to or longer than a predetermined value, the impact is caused in the vehicle due to insufficient torque of the engine 10 corresponding to the predetermined value. Therefore, in order to prevent the impact in the vehicle, a controller 80 (see FIG. 3) drives the MHSG 30 to assist the engine torque.

Figure 3:
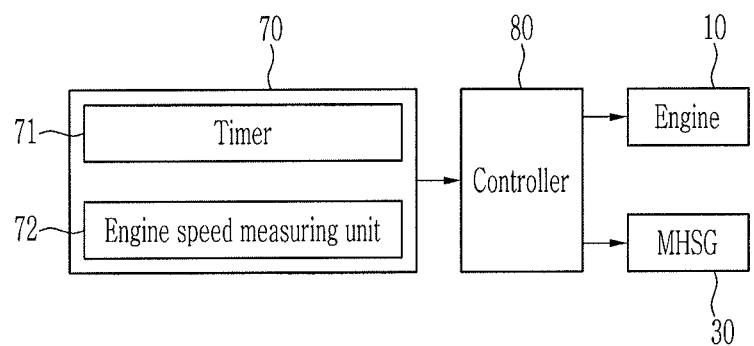
FIG. 3 is a block diagram of an engine torque control apparatus of a mild hybrid electric vehicle according to an exemplary embodiment of the present invention.

FIG. 3 is a block diagram of an engine torque control apparatus of a mild hybrid electric vehicle according to an exemplary embodiment of the present invention.

As illustrated in in FIG. 3, an engine torque control apparatus according to an exemplary embodiment of the present invention includes a data detecting unit 70 and a controller 80.

The data detecting unit 70 detects data for controlling the engine torque to transmit the data to the controller 80. The data detecting unit may include a timer 71 and an engine speed measuring unit 72.

The timer 71 measures a maintaining period when the engine 10 operates in the MPI engine mode and transmits the maintaining period to the controller 80.

The engine speed measuring unit 72 measures a load and an RPM of the engine 10 to transmit the load and the RPM to the controller 80.

The controller 80 determines a fuel injection mode by predetermined mapping data, based on the RPM and the load of the engine 10 received from the engine speed measuring unit 72. That is, the controller 80 determines whether the current fuel injection mode is the MPI, GDI, or hybrid MPI and GDI engine mode. Further, the controller 80 determines whether the fuel injection mode of the engine 10 needs to be changed, by the predetermined mapping data and if the fuel injection mode needs to be changed, the controller 80 controls to change the fuel injection mode. The mapping data is an arbitrary value set by those skilled in the art.

Further, the controller 80 determines whether to assist the torque of the engine 10 by driving the MHSG 30 based on the maintaining period measured by the timer 71 and a torque amount to be assisted to the engine by the MHSG 30 when the torque of the engine 10 is assisted. The assisted torque amount refers to a torque assisted to prevent the impact from being generated in the vehicle when the MPI engine mode is changed into the GDI engine mode or hybrid MPI and GDI engine mode and is arbitrary value set by those skilled in the art.

For example, the assisted torque amount may be an insufficient amount of the engine torque in proportion to the difference between the fuel amount which is actually supplied from the high pressure injector 120 and the target fuel amount which is supplied by the high pressure injector 120 in accordance with a driving condition of the engine 10 and is proportional to the maintaining period, but is not limited thereto.

The controller 80 may be implemented by at least one processor which operates by the set program and the set program may be programmed to perform individual steps of the engine torque control method of a mild hybrid electric vehicle.

Figure 4:
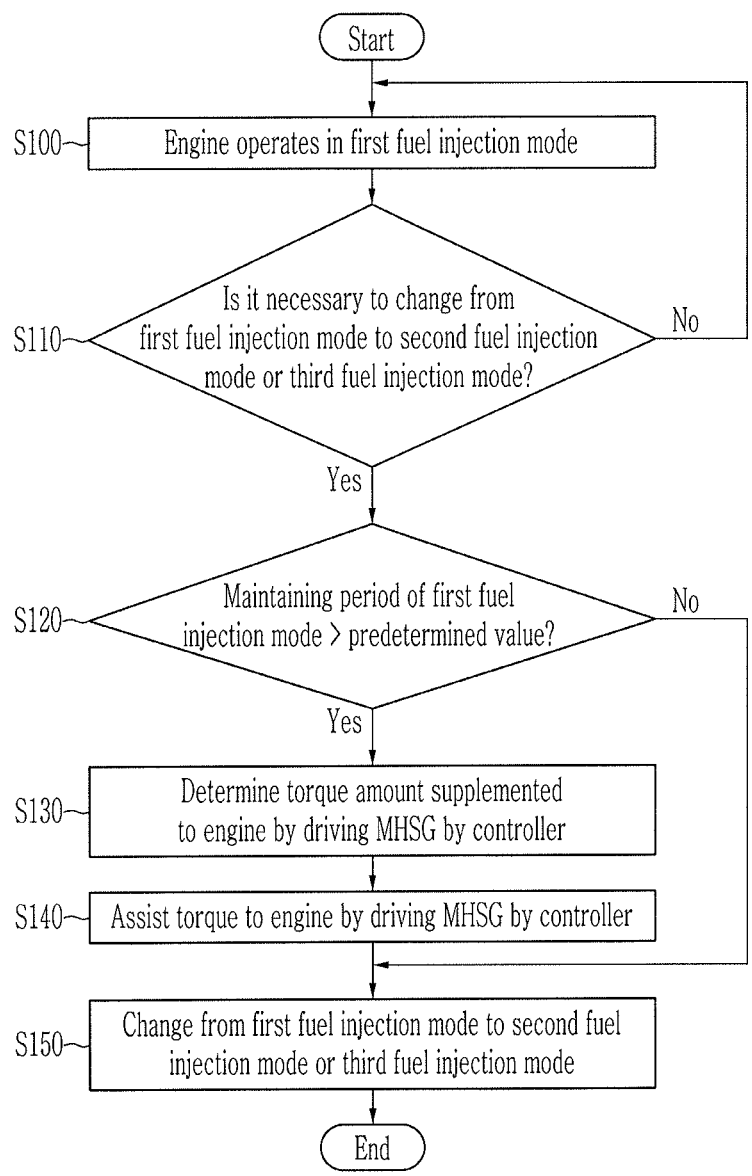
FIG. 4 is a flowchart of an engine torque control method of a mild hybrid electric vehicle according to an exemplary embodiment of the present invention.

FIG. 4 is a flowchart of an engine torque control method of a mild hybrid electric vehicle according to an exemplary embodiment of the present invention.

As illustrated in FIG. 4, an engine torque control method according to an exemplary embodiment of the present invention starts when the engine 10 operates in a MPI engine mode in step S100. When the engine 10 starts to operate in the MPI engine mode, the timer 71 operates and the engine 10 measures a maintaining period when an operation to the MPI engine mode of the engine 10 is maintained and transmits the maintaining period to the controller 80.

Next, the controller 80 determines whether it is necessary to change the fuel injection mode of the engine 10, based on the data detected by the data detecting unit 70 in step S110. That is, it is determined whether it is necessary to change the fuel injection mode of the engine 10 from the MPI engine mode to the GDI engine mode or hybrid MPI and GDI engine mode by a predetermined mapping data, based on the measurement value received by the engine speed measuring unit 72.

In step S110, when it is determined that it is necessary to change the fuel injection mode of the engine 10, the controller 80 determines whether the maintaining period when the MPI engine mode is maintained is longer than a predetermined value in step S120.

The predetermined value is an arbitrary value set by those skilled in the art. When the maintaining period of the MPI engine mode is equal to or longer than the predetermined value, when the MPI engine mode is changed to the GDI engine mode or the hybrid MPI and GDI engine mode, the impact may be generated in the vehicle.

In step S110, when it is determined that it is not necessary to change the fuel injection mode of the engine 10, the engine 10 operates in the MPI engine mode. In this case, the timer 71 is not initialized, but measures the maintaining period of the MPI engine mode.

In step S120, when the maintaining period is longer than the predetermined value, the controller 80 determines a torque amount to be assisted by driving the MHSG 30 in step S130.

The torque amount is a value which is arbitrarily set by those skilled in the art and may be a torque amount which prevents the impact from being generated in the vehicle due to the insufficient torque of the engine 10 by driving the MHSG 30 when the engine 10 is changed from the MPI engine mode to the GDI engine mode or the hybrid MPI and GDI engine mode to assist the torque amount of the engine 10.

In step S120, if the maintaining period is shorter than the predetermined value, the controller 80 may change the fuel injection mode of the engine 10 from MPI engine mode to the GDI engine mode or the hybrid MPI and GDI engine mode without driving the MHSG 30 in step S150.

In step S130, when the torque amount is determined, the controller 80 drives the MHSG 30 to assist the torque to the engine 10 in step S140.

In this case, the torque amount supplemented by driving the MHSG 30 refers to a torque amount determined by the controller 80 in step S130.

In step S140, when the MHSG 30 is driven to assist the torque to the engine 10, the fuel injection mode of the engine 10 is changed from the MPI engine mode to the GDI engine mode or the hybrid MPI and GDI engine mode in step S150.

Immediately before changing the fuel injection mode, the MHSG 30 is driven to assist the torque to the engine 10 so that it is possible to prevent the impact from being generated in the vehicle due to the insufficient torque of the engine 10 caused immediately after changing the fuel injection mode.

As described above, according to the exemplary embodiment of the present invention, even though the fuel injection mode is changed from the MPI engine mode to the GDI engine mode or the hybrid MPI and GDI engine mode, the controller 80 assists the torque to the engine 10 by driving the MHSG 30 so that the driver may stably drive the vehicle.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 10: Engine | 20: Transmission |
| 30: MHSG | 40: Battery |
| 50: Differential gear device | 60: Wheel |
| 70: Data detecting unit | 71: Timer |
| 72: Engine speed measuring unit | 80: Controller |
| 110: Low pressure injector | 120: High pressure injector |
| 130: Intake port | 140: Combustion chamber |
| 150: Exhaust port | |

What is claimed is:

1. An engine torque control method of a mild hybrid electric vehicle including an engine as a power source,
the mild hybrid electric vehicle further including a mild hybrid starter and generator (MHSG) which is connected to the engine to assist output of the engine, to start the engine and to operate as a generator by an engine torque and a controller which controls a change of a fuel injection mode among a MPI engine mode using a low pressure injector which injects a fuel to an intake port of the engine, a GDI engine mode using a high pressure injector which injects the fuel to a combustion chamber of the engine, and a hybrid MPI and GDI engine mode using both the low pressure injector and the high pressure injector,
the engine torque control method, comprising:
determining whether the fuel injection mode is the MPI engine mode, by the controller;
measuring a maintaining period in which the MPI engine mode is maintained by a timer when the fuel injection mode is the MPI engine mode;
determining whether it is necessary to change the fuel injection mode from the MPI engine mode to the GDI engine mode or the hybrid MPI and GDI engine mode, by the controller;
driving the MHSG by the controller to assist the engine torque when it is necessary to change the fuel injection mode from the MPI engine mode to the GDI engine mode or the hybrid MPI and GDI engine mode; and
determining whether the maintaining period in which the MPI engine mode is maintained is longer than a predetermined value when it is necessary to change the fuel injection mode from the MPI engine mode to the GDI engine mode or the hybrid MPI and GDI engine mode,
wherein the driving of the MHSG by the controller to assist the engine torque is performed only when the maintaining period is larger than the predetermined value.

2. The engine torque control method of the mild hybrid electric vehicle of claim 1, wherein:
the mild hybrid electric vehicle further includes an engine speed measuring unit which measures a speed and a load of the engine; and
the controller controls the changing of the fuel injection mode based on predetermined mapping data based on the speed and the load of the engine.

3. The engine torque control method of the mild hybrid electric vehicle of claim 1, wherein when the maintaining period is equal to or shorter than the predetermined value, the controller changes the fuel injection mode without driving the MHSG.

4. An engine torque control system of a mild hybrid electric vehicle, the engine torque control system comprising:

an engine which includes an intake port, a low pressure injector configured to inject a fuel to the intake port, a combustion chamber which communicates with the intake port and combusts mixture of air and the fuel, an exhaust port which communicates with the combustion chamber and exhausts exhaust gas generated during a combustion process, and a high pressure injector which directly injects the fuel to the combustion chamber;

a mild hybrid starter and generator (MHSG) which is operatively connected to the engine to start the engine or operates as a generator by a power of the engine;

a timer which measures a maintaining period; and a controller which controls changing of a fuel injection mode among a MPI engine mode of injecting the fuel using the low pressure injector, a GDI engine mode of injecting the fuel using the high pressure injector, and a hybrid MPI and GDI engine mode of injecting the fuel using both the low pressure injector and the high pressure injector, based on a driving state of the engine;

wherein the controller determines whether it is necessary to change from the MPI engine mode to the GDI engine mode or the hybrid MPI and GDI engine mode and when it is necessary to change from the MPI engine mode to the GDI engine mode or the hybrid MPI and GDI engine mode, uses the MHSG to assist an engine torque based on the maintaining period in which the MPI engine mode is maintained, wherein when it is necessary to change the fuel injection mode from the MPI engine mode to the GDI engine mode or the hybrid MPI and GDI engine mode, the controller determines whether the maintaining period in which the MPI engine mode is maintained is longer than a predetermined value, and wherein, only when the maintaining period is longer than the predetermined value, the controller drives the MHSG to assist the engine torque.

5. The engine torque control system of the mild hybrid electric vehicle of claim 4, further comprising:

an engine speed measuring unit which measures a speed and a load of the engine, wherein the controller controls the changing of the fuel injection mode based on predetermined mapping data based on the speed and the load of the engine.

6. The engine torque control system of the mild hybrid electric vehicle of claim 4, wherein when the maintaining period is equal to or shorter than the predetermined value, the controller changes the fuel injection mode without driving the MHSG.

* * * * *